United States Patent
Yu (10) Patent No.: US 8,696,189 B2
(45) Date of Patent: Apr. 15, 2014

(54) LIGHT-GUILD-PLATE POSITIONING SHEET AND CORRESPONDING BACKLIGHT MODULE

(75) Inventor: Gang Yu, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 295 days.

(21) Appl. No.: 13/264,848

(22) PCT Filed: Aug. 19, 2011

(86) PCT No.: PCT/CN2011/078647
§ 371 (c)(1),
(2), (4) Date: Oct. 17, 2011

(87) PCT Pub. No.: WO2013/023382
PCT Pub. Date: Feb. 21, 2013

(65) Prior Publication Data
US 2013/0044516 A1  Feb. 21, 2013

(30) Foreign Application Priority Data
Aug. 18, 2011 (CN) .......................... 2011 1 0237875

(51) Int. Cl.
*F21V 7/04* (2006.01)
(52) U.S. Cl.
USPC ......................................... 362/634; 362/621
(58) Field of Classification Search
USPC ................... 362/632–634, 621, 612
See application file for complete search history.

(56) References Cited

U.S. PATENT DOCUMENTS

| | | | |
|---|---|---|---|
| 7,819,574 B2* | 10/2010 | Yoo et al. | 362/633 |
| 2008/0143918 A1 | 6/2008 | Kim | |
| 2009/0128730 A1* | 5/2009 | Hsu et al. | 349/58 |
| 2010/0149835 A1 | 6/2010 | Cho et al. | |
| 2010/0258697 A1 | 10/2010 | Tseng | |
| 2011/0149602 A1* | 6/2011 | Lee et al. | 362/612 |
| 2012/0287666 A1* | 11/2012 | Kwon et al. | 362/602 |

FOREIGN PATENT DOCUMENTS

| | | |
|---|---|---|
| CN | 101201510 A | 6/2008 |
| CN | 101561101 A | 10/2009 |
| CN | 101614352 A | 12/2009 |
| CN | 101660724 A | 3/2010 |
| CN | 101858577 A | 10/2010 |
| CN | 201636705 U | 11/2010 |
| JP | 2008299181 A | 12/2008 |

* cited by examiner

*Primary Examiner* — Julie Bannan
(74) *Attorney, Agent, or Firm* — Mark M. Friedman (57) ABSTRACT

The present invention provides a light-guide-plate (LGP) positioning sheet, which comprises: a fixing portion used to fix the LGP positioning sheet onto a fixing frame of a backlight module, a positioning portion used to abut against and position a light guide plate, and a connecting portion used to connect the fixing portion and the positioning portion. The present invention is further related to a backlight module. According to the LGP positioning sheet and the backlight module of the present invention, the LGP positioning sheet can efficiently ensure the complete alignment between a light emitting diode (LED) light source and a light input side surface of the light guide plate, so as to increase the light utilization rate of the light guide plate.

16 Claims, 5 Drawing Sheets

LIGHT-GUILD-PLATE POSITIONING SHEET AND CORRESPONDING BACKLIGHT MODULE

FIELD OF THE INVENTION

The present invention relates to a field of a liquid crystal display (LCD), and more particularly to a light-guide-plate (LGP) positioning sheet and a corresponding backlight module, both of which can ensure the complete alignment between a light emitting diode (LED) light source and a light guide plate.

BACKGROUND OF THE INVENTION

Figure 1:
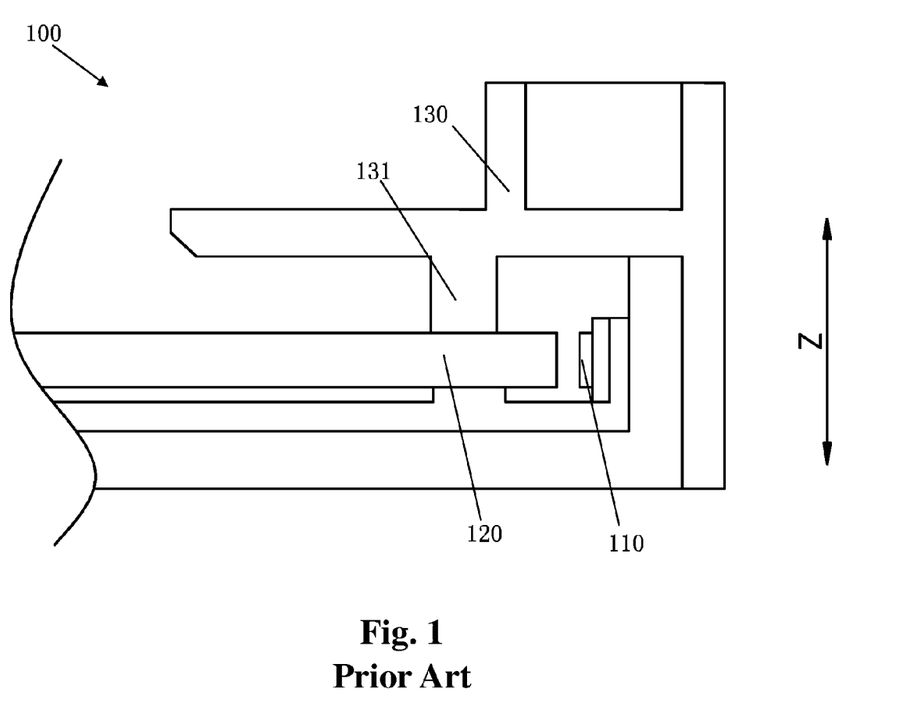
FIG. 1 is a structural schematic drawing of a backlight module of traditional technology.

With the development of society, more and more people begin to use large-size liquid crystal displays (LCDs). As shown in FIG. 1, it is a backlight module 100 nowadays, wherein numeral 110 is a light emitting diode (LED) light source, and numeral 120 is a light guide plate. The alignment between the LED light source 110 and the light guide plate 120 is achieved by a formed projection 131 on a plastic frame 130, which abuts against and positions the light guide plate 120. However, with the size enlargement trend of the light guide plate 120 and the progress of the thin-type design thereof, the pressure of the plastic frame 130 abutting against the light guide plate 120 by the formed projection 131 is already unable to ensure the complete alignment between the LED light source 110 and a light input side surface of the light guide plate 120, namely, the light input side surface of the light guide plate 120 and the light output surface of the LED light source 110 are matched with each other in the direction of Z axis. As a result, the light utilization rate of the light guide plate 120 is decreased, and the design cost of the light guide plate 120 is increased.

As a result, it is necessary to provide a light-guide-plate positioning sheet and a corresponding backlight module to solve the problems existing in the conventional technologies.

SUMMARY OF THE INVENTION

The object of the present invention is to provide a light-guide-plate (LGP) positioning sheet and a corresponding backlight module, so as to solve the problem existing in the conventional technologies that the light guide plate is unable to ensure the complete alignment between a light emitting diode (LED) light source and a light input side surface of the light guide plate causing that the light utilization rate of the light guide plate is decreased and the design cost of the light guide plate is increased.

The present invention is to design a light-guide-plate (LGP) positioning sheet, wherein the LGP positioning sheet comprises: a fixing portion used to fix the LGP positioning sheet onto a fixing frame of a backlight module; a positioning portion used to abut against and position a light guide plate; a connecting portion used to connect the fixing portion and the positioning portion; and a retaining portion used for keeping the distance between a light output surface of a light emitting diode (LED) light source and a light input side surface of the light guide plate; the positioning portion is a planar plate which is in contact with a contact surface of the light guide plate in parallel; the retaining portion is formed by bending the positioning portion; the fixing portion is further provided with an adjustable groove which can adjust the distance kept by the retaining portion, and a screw member which is matched with the adjustable groove to fix the LGP positioning sheet on the fixing frame.

The present invention is to design a light-guide-plate (LGP) positioning sheet, wherein the LGP positioning sheet comprises: a fixing portion used to fix the LGP positioning sheet onto a fixing frame of a backlight module; a positioning portion used to abut against and position a light guide plate; and a connecting portion used to connect the fixing portion and the positioning portion.

In one embodiment of the present invention, the positioning portion is a planar plate, which is in contact with a contact surface of the light guide plate in parallel.

In one embodiment of the present invention, the fixing portion is provided with a connecting hole which connects the LGP positioning sheet to the fixing frame of the backlight module by using a screw member.

In one embodiment of the present invention, the LGP positioning sheet further comprises a retaining portion which is used for keeping the distance between a light output surface of an LED light source and a light input side surface of the light guide plate.

In one embodiment of the present invention, the retaining portion is formed by bending the positioning portion.

In one embodiment of the present invention, the fixing portion further provided with an adjustable groove which can adjust the distance kept by the retaining portion, and a screw member which is matched with the adjustable groove to fix the LGP positioning sheet on the fixing frame.

The present invention further designs a backlight module comprising a light guide plate, a back plate, a fixing frame, a LED light source, and at least one light-guide-plate (LGP) positioning sheet, wherein the LGP positioning sheet comprises: a fixing portion used to fix the LGP positioning sheet onto a fixing frame of a backlight module; a positioning portion used to abut against and position a light guide plate; and a connecting portion used to connect the fixing portion and the positioning portion.

In one embodiment of the present invention, the positioning portion is a planar plate, which is in contact with a contact surface of the light guide plate in parallel.

In one embodiment of the present invention, the fixing portion is provided with a connecting hole which connects the LGP positioning sheet and the fixing frame of the backlight module by using a screw member.

In one embodiment of the present invention, the LGP positioning sheet further comprises a retaining portion which is used for keeping the distance between the light output surface of the LED light source and a light input side surface of the light guide plate.

In one embodiment of the present invention, the retaining portion is formed by bending the positioning portion.

In one embodiment of the present invention, the fixing portion further provided with an adjustable groove which can adjust the distance kept by the retaining portion, and a screw member which is matched with the adjustable groove to fix the LGP positioning sheet on the fixing frame.

In one embodiment of the present invention, the LGP positioning sheet is installed on one side of the light input side surface of the light guide plate.

In comparison with the traditional LGP positioning sheet and the corresponding backlight module which have problems that it is unable to ensure the complete alignment between the LED light source and the light input side surface of the light guide plate causing that the light utilization rate of the light guide plate is decreased and the design cost of the light guide plate is increased, the LGP positioning sheet and the corresponding backlight module according to the present invention provide the LGP positioning sheet to efficiently ensure the complete alignment between the LED light source and the light input side surface of the light guide plate, so as to increase the light utilization rate of the light guide plate.

For above-mention contents of the present invention can be best understood by referring to the following detailed description of the preferred embodiments and the accompanying drawings.

DETAILED DESCRIPTION OF THE PREFERRED EMBODIMENTS

The following description of the embodiments refers to the drawings, so as to illustrate the specific embodiments of the present invention which can be carried out. The directional terms described in the present invention, such as upper, lower, front, rear, left, right, inner, outer, side and etc., are only directions referring to the accompanying drawings, so that the used directional terms are used to describe and understand the present invention, but the present invention is not limited thereto.

In the drawings, the units with the similar structure use the same numerals.

A light-guide-plate (LGP) positioning sheet according to the present invention efficiently ensures a complete alignment between a light emitting diode (LED) light source and a light input side surface of a light guide plate by the design of a positioning portion, and the light utilization rate of the light guide plate is increased. Besides, the LGP positioning sheet is simple in the structure.

Figure 2:
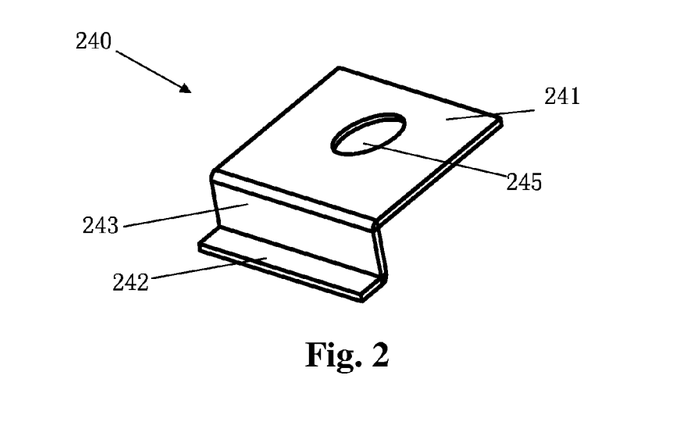
FIG. 2 is a perspective structural schematic drawing of a light-guide-plate (LGP) positioning sheet according to a first preferred embodiment of the present invention.
Figure 3:
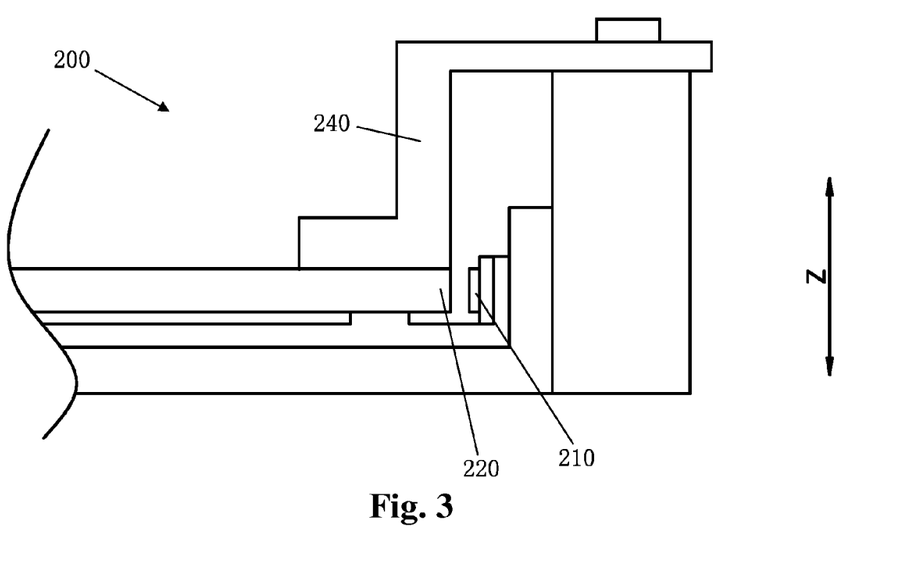
FIG. 3 is an operational schematic drawing of an LGP positioning sheet according to the first preferred embodiment of the present invention.

As a first preferred embodiment of a LGP positioning sheet according to the present invention, in the structural schematic drawings of FIG. 2 and FIG. 3, a LGP positioning sheet 240 comprises a fixing portion 241, a positioning portion 242, and a connecting portion 243. The fixing portion 241 is used to fix the LGP positioning sheet 240 onto a fixing frame of a backlight module 200; the positioning portion 242 is used to abut against and position a light guide plate 220; the connecting portion 243 is used to connect the fixing portion 241 and the positioning portion 242. When the LGP positioning sheet 240 of the present invention is in use, the fixing portion 241, the positioning portion 242, and the connecting portion 243 can be correspondingly designed according to the size and thickness of the light guide plate 220. For example, the connecting portion 243 can be designed to longer in the length thereof, if the light guide plate 220 is thinner; or the connecting portion 243 can be designed to shorter in the length thereof, if the light guide plate 220 is thicker. Thus, the various light guide plates 220 can be well fixed in the backlight modules 200 by using different LGP positioning sheets 240, and it can ensure the complete alignment between an LED light source 210 and a light input side surface of the light guide plate 220. The fixing portion 241 is provided with a connecting hole 245 which connects the LGP positioning sheet 240 to the fixing frame of the backlight module 200 by using a screw member, so as to ensure that the LGP positioning sheet 240 is firmly fixed onto the backlight module 200. The positioning portion 242 is a planar plate which is in contact with the contact surface of the light guide plate 220 in parallel, and the size of the planar plate of the positioning portion 242 can be designed according to the actual area of the light guide plate 220. When the area of the light guide plate 220 is larger, the area of the planar plate can be designed as a larger one for ensuring the positioning effect; when the area of the light guide plate 220 is smaller, the area of the planar plate can be designed as a smaller one, so as to also ensure the positioning effect. Certainly, the positioning portion 242 can be designed as other shapes (such as U-shape) which can abut against and position the light guide plate 220, and can be designed according to the substantial requirement of customers. The LGP positioning sheet 240 can be made of material having rigid strength, such as metal material.

When the LGP positioning sheet 240 according to the present invention is installed for use, the positioning portion 242 is firstly in contact with, abuts against and positions the light guide plate 220; and then the LGP positioning sheet 240 is connected with the fixing frame of the backlight module 200 by using a screw member (bolt) which passes through the connecting hole 245 of the fixing portion 241, so that the relative location of the positioning portion 242 and the light guide plate 220 is fixed. Then, the LGP positioning sheet 240 is firmly connected with the backlight module 200, so as to ensure the complete alignment between the LED light source 210 and the light input side surface of the light guide plate 220.

Figure 4:
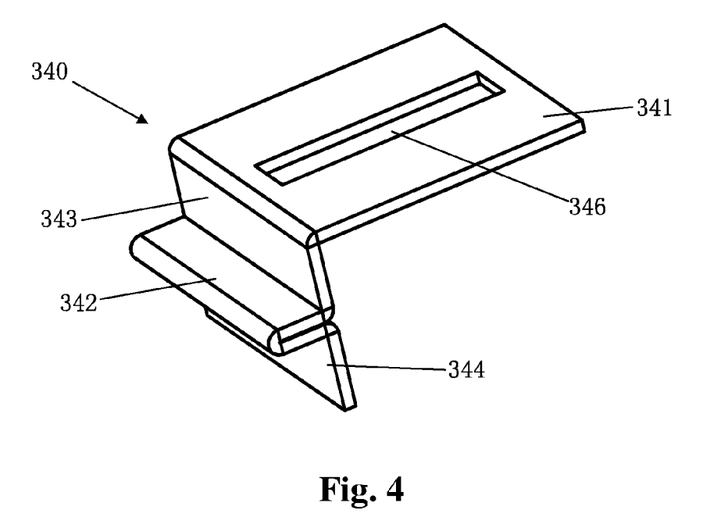
FIG. 4 is a perspective structural schematic drawing of an LGP positioning sheet according to a second preferred embodiment of the present invention.
Figure 5:
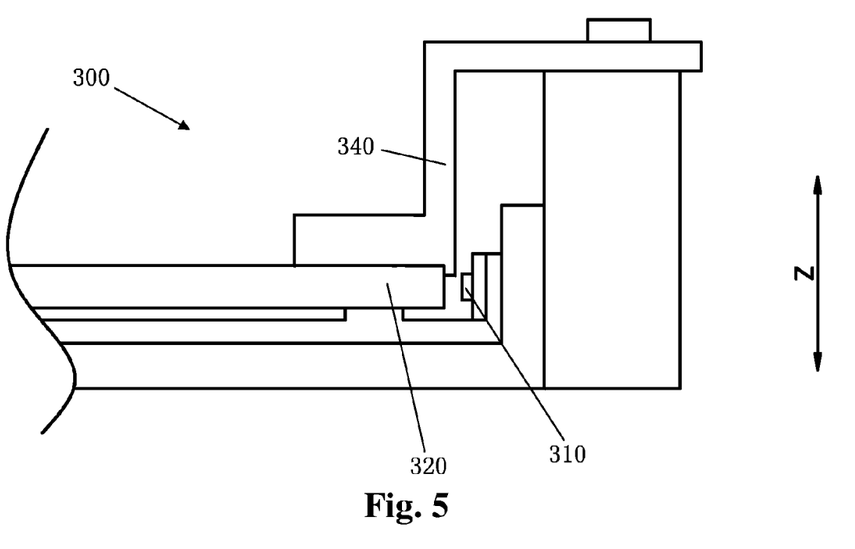
FIG. 5 is an operational schematic drawing of an LGP positioning sheet according to the second preferred embodiment of the present invention.

As the second preferred embodiment of the LGP positioning sheet according to the present invention, in the structural schematic drawings of FIG. 4 and FIG. 5, an LGP positioning sheet 340 further comprises a retaining portion 344. The retaining portion 344 is used for keeping the distance between the light output surface of the encapsulant of the LED light source 310 and the light input side surface of the light guide plate 320, and the retaining portion 344 is formed by bending the positioning portion 342. Moreover, the fixing portion 341 is further provided with an adjustable groove 346 which can adjust the distance kept by the retaining portion 344, and a screw member which is matched with the adjustable groove 346 to fix the LGP positioning sheet 340 on the fixing location of the fixing frame of the backlight module 300. In a condition that the implementation and the beneficial effect the same as the first preferred embodiment can be achieved, the LGP positioning sheet 340 according to the present embodiment can further ensure the distance between the light output surface of the encapsulant of the LED light source 310 and the light input side surface of the light guide plate 320 by using the retaining portion 344, and avoid that the distance between the encapsulant of the LED light source 310 and the light input side surface of the light guide plate 320 is decreased due to operation or other reasons to affect the light extraction efficiency. Of course, the retaining portion 344 can also use the other manufacture methods to achieve. Furthermore, it can adjust the distance between the encapsulant of the LED light source 310 and the light input side surface of the light guide plate 320 by the retaining portion 344 and the adjustable groove 346. The adjustable groove 346 is generally designed as a long-stripe shape, when the distance between the light output surface of the encapsulant of the LED light source 310 and the light input side surface of the light guide plate 320 is unfit, it can loosen the screw member (bolt) on the fixing portion 341 and adjust the relative location between the positioning portion 342 and the light guide plate 320 by adjusting the relative position of the screw member abutting against the corresponding adjustable groove 346, Thus, the light guide plate 320 is kept on a suitable location by the retaining portion 344 away from the LED light source 310, and then the screw member on the fixing portion 341 is tightened, so as to fix the LGP positioning sheet 340 on the backlight module 300.

When the LGP positioning sheet 340 according to the present invention is installed for use, the positioning portion 342 is firstly in contact with, abuts against and positions the light guide plate 320. Meanwhile, the retaining portion 344 keeps the distance between the light output surface of the encapsulant of the LED light source 310 and the light input side surface of the light guide plate 320, and then the LGP positioning sheet 340 is connected with the backlight module 300 by using the screw member which passes through the adjustable groove 346 of the fixing portion 341, so that the relative location of the positioning portion 342 and the light guide plate 320 can be fixed. Then, the LGP positioning sheet 340 is firmly connected with the fixing frame of the backlight module 300, so as to ensure that the complete alignment between the LED light source 310 and the light input side surface of the light guide plate 320. Furthermore, it can adjust the distance between the encapsulant of the LED light source 310 and the light input side surface of the light guide plate 320, so as to ensure that the light utilization rate of the light guide plate 320 when using different LED light sources 310.

Figure 6:
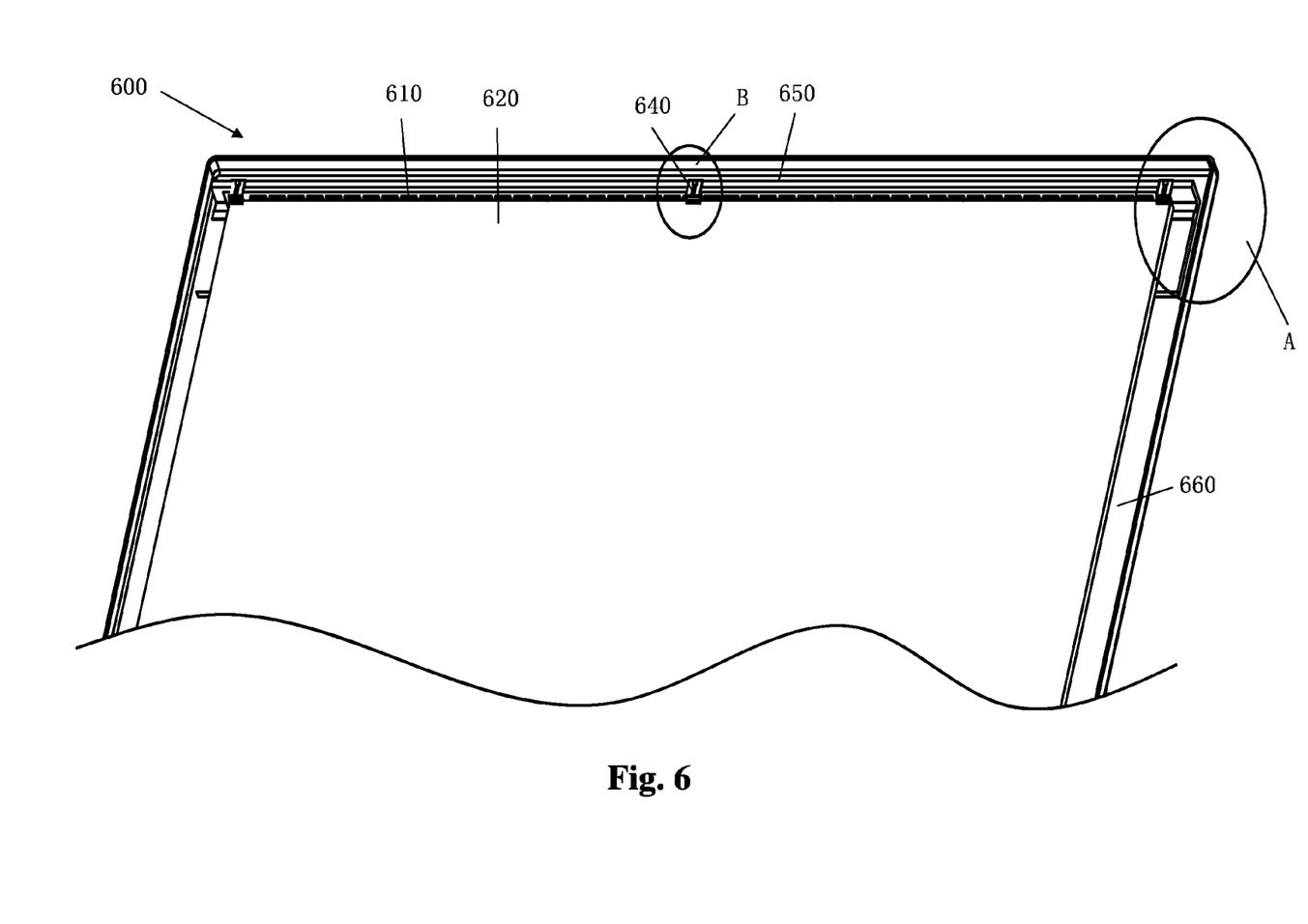
FIG. 6 is a perspective structural schematic drawing of a backlight module according to the preferred embodiment of the present invention.
Figure 7:
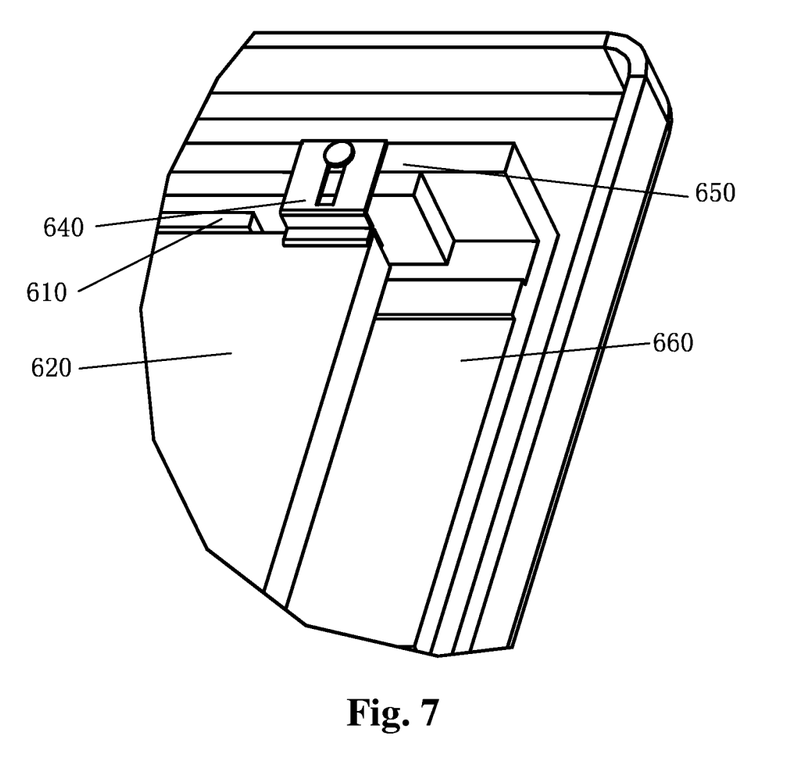
FIG. 7 is a partially enlarged drawing of a part-A of FIG. 6.
Figure 8:
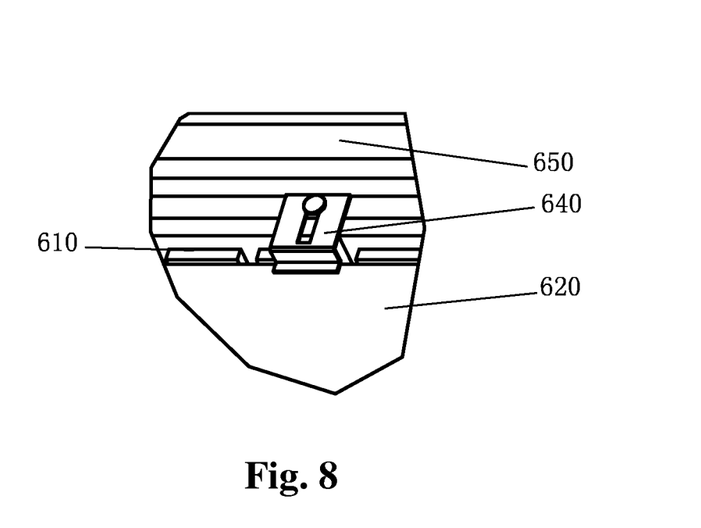
FIG. 8 is a partially enlarged drawing of a part-B of FIG. 6.

The present invention further relates to a backlight module. In a structural schematic drawing of a preferred embodiment of a backlight module according to the present invention of FIG. 6, FIG. 7 is a partially enlarged drawing of a part-A of FIG. 6, and FIG. 8 is a partially enlarged drawing of a part-B of FIG. 6. The backlight module 600 comprises a light guide plate 620, a back plate 660, a fixing frame 650, a LED light source 610, and at least one LGP positioning sheet 640. As shown, the LGP positioning sheet 640 comprises the fixing portion, the positioning portion, and the connecting portion. The fixing portion is used to fix the LGP positioning sheet 640 onto the fixing frame 650; the positioning portion is used to abut against and position the light guide plate 620; the connecting portion is used to connect the fixing portion and the positioning portion. When the backlight module 600 is in use, the fixing portion, the positioning portion, and the connecting portion of the corresponding LGP positioning sheet 640 can be designed according to the size and thickness of the used light guide plate 620. If the light guide plate 620 is thinner, the length of the connecting portion can be longer; if the light guide plate 620 is thicker, the length of the connecting portion can be shorter. Thus, the various light guide plates 620 can be well fixed in the backlight modules 600 by using different LGP positioning sheets 640, and it can efficiently ensure a complete alignment between the LED light source 610 and the light input side surface of the light guide plate 620. The fixing portion is provided with the connecting hole, which is passed through the bolt to connect the LGP positioning sheet 640 and the fixing frame of the backlight module 600, so as to ensure that the LGP positioning sheet 640 firmly fixed onto the backlight module 600. The positioning portion is a planar plate which is in contact with the contact surface of the light guide plate 620 in parallel, and the size of the planar plate of the positioning portion can be designed according to the actual area of the light guide plate 620. When the area of the light guide plate 620 is larger, the area of the planar plate can be designed as a larger one for ensuring the positioning effect; when the area of the light guide plate 620 is smaller, the area of the planar plate can be designed as a smaller one, so as to also can ensure the positioning effect. Certainly, the positioning portion can be designed as other shapes which can abut against and position the light guide plate 620, such as U-shape, and can be designed according to the substantial requirement of customers. The LGP positioning sheet 640 can be made of material having rigid strength, such as metal material.

Furthermore, as shown in FIG. 4, the LGP positioning sheet 640 of the backlight module 600 according to the present invention further comprises the retaining portion. The retaining portion is used for keeping the distance between the light output surface of the encapsulant of the LED light source 610 and the light input side surface of the light guide plate 620, and the retaining portion is formed by bending the positioning portion. Moreover, the fixing portion is further provided with the adjustable groove which can adjust the distance kept by the retaining portion, and the screw member which is matched with the adjustable groove to fix the LGP positioning sheet 640 on the fixing location of the fixing frame 650 of the backlight module 600. In a condition that the implementation and the beneficial effect the same as the first preferred embodiment can be achieved, the LGP positioning sheet 640 according to the present embodiment can further ensures the distance between the light output surface of the encapsulant of the LED light source 610 and the light input side surface of the light guide plate 620 by using the retaining portion, and avoid that the distance between the encapsulant of the LED light source 610 and the light input side surface of the light guide plate 620 is decreased due to operation or other reasons to affect the light extraction efficiency. Of course the retaining portion can also use the other manufacture methods to achieve. Furthermore, it can be adjusted that the distance between the encapsulant of the LED light source 610 and the light input side surface of the light guide plate 620 by the retaining portion and the adjustable groove. The adjustable groove is generally set as a long-strap shape, when the distance between the light output surface of the encapsulant of the LED light source 610 and the light input side surface of the light guide plate 620 is unfit, it can loosen the screw member on the fixing portion and adjust the relative location between the positioning portion and the light guide plate 620 by adjusting the relative position of the screw member abutting against the corresponding adjustable groove. As a result, the light guide plate 620 is kept on a suitable location by the retaining portion away from the LED light source 610, and the screw member on the fixing portion is tightened, so as to fix the LGP positioning sheet 640 on the backlight module 600.

When the backlight module 600 according to the present invention is in use, the LGP positioning sheet 640 is firstly in contact with, abuts against and positions the light guide plate 620. Meanwhile, the LGP positioning sheet 640 keeps the distance between the light output surface of the encapsulant of the LED light source 610 and the light input side surface of the light guide plate 620, and the LGP positioning sheet 640 is connected with the fixing frame of the backlight module 600 together by using the screw member which passes through the adjustable groove of the fixing portion, so that the relative location of the positioning portion and the light guide plate 620 is fixed. Then, the LGP positioning sheet 640 is firmly connected with the fixing frame of the backlight module 600, so as to ensure that the complete alignment between the LED light source 610 and the light input side surface of the light guide plate 620. Furthermore, it can adjust the distance between the encapsulant of the LED light source 610 and the light input side surface of the light guide plate 620, so as to ensure that the light utilization rate of the light guide plate 620 when using different LED light sources 610.

As the preferred embodiment of the backlight module according to the present invention, the LGP positioning sheet 640 is installed on one side of the light input side surface of the light guide plate 620. As shown in FIG. 6, the LGP positioning sheets 640 are all installed on one side of the light input side surface of the light guide plate 620, so as to ensure the complete alignment between the light output surface of the encapsulant of the LED light source 610 and the light input side surface of the light guide plate 620. Meanwhile, a plurality of LGP positioning sheet 640 can be installed on one side of the light input side surface of the light guide plate 620 (there are three LGP positioning sheet in the drawing), so as to ensure the positioning effect. Furthermore, the installed LGP positioning sheet 640 can have the retaining portion and/or have no the retaining portion, and it can be differently installed according to the specific requirement of users. Of cause, other sides of the light guide plate 620 can also install the corresponding LGP positioning sheet 640 for positioning according to needs, so as to ensure an effective transmission of light and the light extraction efficiency of the light guide plate 620.

As described above, the present invention has been described with a preferred embodiment thereof and it is understood that many changes and modifications to the described embodiment can be carried out without departing from the scope and the spirit of the invention that is intended to be limited only by the appended claims.

The invention claimed is:

1. A light-guide-plate (LGP) positioning sheet, characterized in that: the LGP positioning sheet comprises:
   a fixing portion fixing the LGP positioning sheet onto a fixing frame protruded from an edge of a back plate of a backlight module;
   a positioning portion abutting against and positioning a light guide plate;
   a connecting portion connecting the fixing portion to the positioning portion; and
   a retaining portion keeping a distance between a light output surface of a light emitting diode (LED) light source and a light input side surface of the light guide plate;
   wherein the positioning portion is a planar plate which is in contact with a contact surface of the light guide plate in parallel; the retaining portion is formed by bending the positioning portion outward and downward in turn; the fixing portion is further provided with an adjustable groove which adjusts the distance kept by the retaining portion, and a screw member which is matched with the adjustable groove to fix the LGP positioning sheet on the fixing frame;
   wherein the fixing portion has an outer end horizontally fixed on the fixing frame and an inner end extended downward to form the connecting portion; and a bottom end of the connecting portion is horizontally extended inward to form the positioning portion abutted against an upper surface of the light guide plate.

2. A light-guide-plate (LGP) positioning sheet, characterized in that: the LGP positioning sheet comprises:
   a fixing portion fixing the LGP positioning sheet onto a fixing frame protruded from an edge of a back plate of a backlight module;
   a positioning portion abutting against and positioning a light guide plate; and
   a connecting portion connecting the fixing portion to the positioning portion;
   wherein the fixing portion has an outer end horizontally fixed on the fixing frame and an inner end extended downward to form the connecting portion; and a bottom end of the connecting portion is horizontally extended inward to form the positioning portion abutted against an upper surface of the light guide plate.

3. The LGP positioning sheet according to claim 2, characterized in that: the positioning portion is a planar plate which is in contact with a contact surface of the light guide plate in parallel.

4. The LGP positioning sheet according to claim 2, characterized in that: the fixing portion is provided with a connecting hole which connects the LGP positioning sheet to the fixing frame of the backlight module by using a screw member.

5. The LGP positioning sheet according to claim 2, characterized in that: the LGP positioning sheet further comprises a retaining portion which keeps a distance between a light output surface of an LED light source and a light input side surface of the light guide plate.

6. The LGP positioning sheet according to claim 5, characterized in that: the retaining portion is formed by bending the positioning portion.

7. The LGP positioning sheet according to claim 5, characterized in that: the fixing portion is further provided with an adjustable groove which adjusts the distance kept by the retaining portion, and a screw member which is matched with the adjustable groove to fix the LGP positioning sheet on the fixing frame.

8. The LGP positioning sheet according to claim 6, characterized in that: the fixing portion is further provided with an adjustable groove which adjusts the distance kept by the retaining portion, and a screw member which is matched with the adjustable groove to fix the LGP positioning sheet on the fixing frame.

9. A backlight module comprising a light guide plate, a back plate, a fixing frame, an LED light source, and at least one light-guide-plate (LGP) positioning sheet, characterized in that: the LGP positioning sheet comprises:
   a fixing portion fixing the LGP positioning sheet onto a fixing frame protruded from an edge of a back plate of the backlight module;
   a positioning portion abutting against and positioning the light guide plate; and
   a connecting portion connecting the fixing portion to the positioning portion;
   wherein the fixing portion has an outer end horizontally fixed on the fixing frame and an inner end extended downward to form the connecting portion;
   and a bottom end of the connecting portion is horizontally extended inward to form the positioning portion abutted against an upper surface of the light guide plate.

10. The backlight module according to claim 9, characterized in that: the positioning portion is a planar plate which is in contact with a contact surface of the light guide plate in parallel.

11. The backlight module according to claim 9, characterized in that: the fixing portion is provided with a connecting hole which connects the LGP positioning sheet to the fixing frame of the backlight module.

12. The backlight module according to claim 9, characterized in that: the LGP positioning sheet further comprises a retaining portion which keeps a distance between the light output surface of the LED light source and a light input side surface of the light guide plate.

13. The backlight module according to claim 12, characterized in that: the retaining portion is formed by bending the positioning portion.

14. The backlight module according to claim 12, characterized in that: the fixing portion is further provided with an adjustable groove which adjusts the distance kept by the retaining portion, and a screw member which is matched with the adjustable groove to fix the LGP positioning sheet on the fixing frame.

15. The backlight module according to claim 13, characterized in that: the fixing portion is further provided with an adjustable groove which adjusts the distance kept by the retaining portion, and a screw member which is matched with the adjustable groove to fix the LGP positioning sheet on the fixing frame.

16. The backlight module according to claim 9, characterized in that: the LGP positioning sheet is installed on one side of the light input side surface of the light guide plate.

* * * * *